ized at Alliance, in the county of Stark and State of
UNITED STATES PATENT OFFICE.

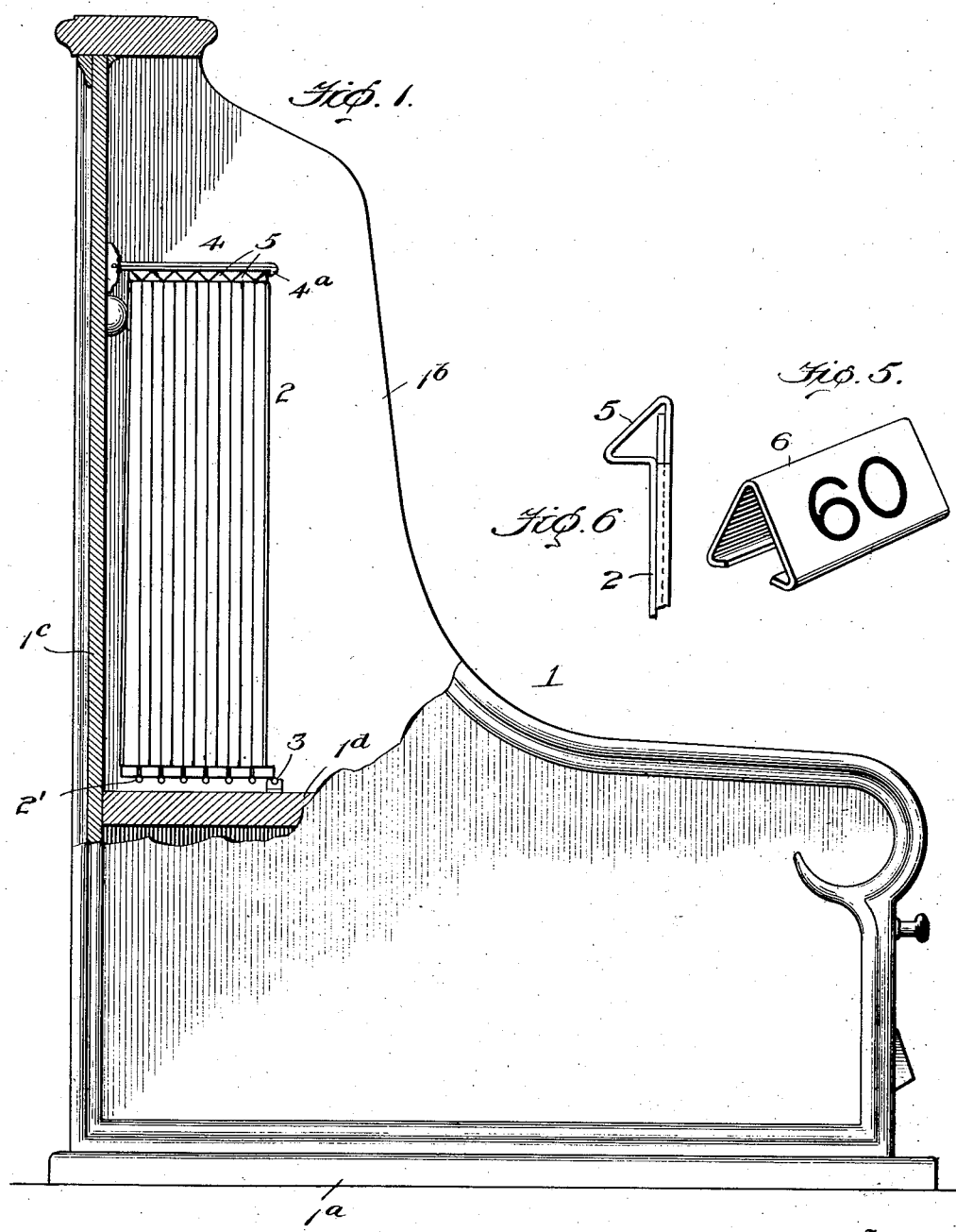

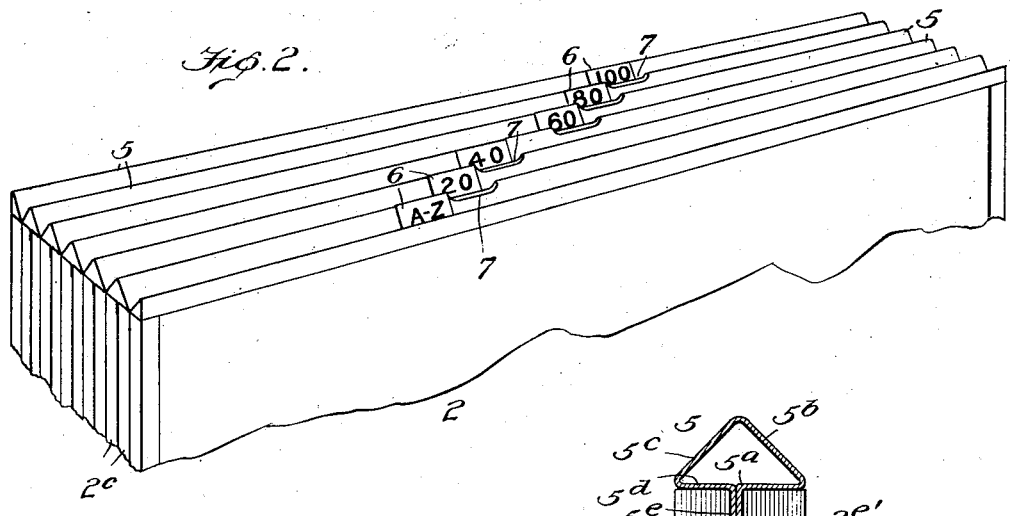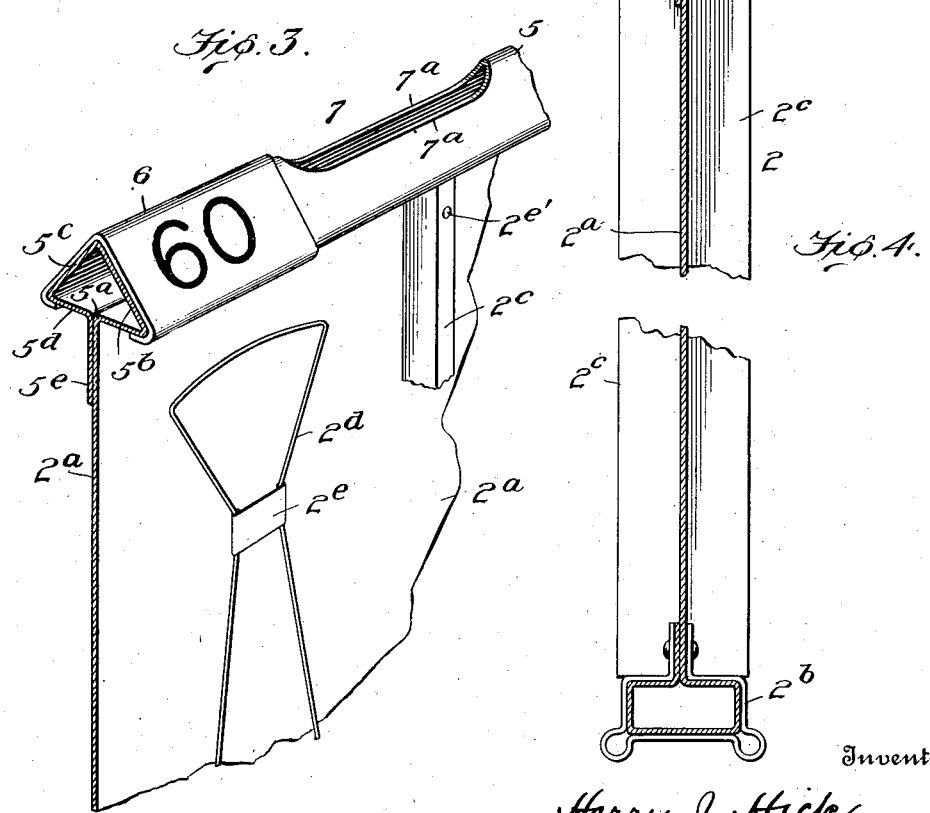

HARRY J. HICK, OF ALLIANCE, OHIO, ASSIGNOR TO THE McCASKEY REGISTER COMPANY, OF ALLIANCE, OHIO, A CORPORATION OF OHIO.

FILING APPLIANCE.

1,055,041.  Specification of Letters Patent.  Patented Mar. 4, 1913.

Application filed May 10, 1911. Serial No. 626,339.

*To all whom it may concern:*

Be it known that I, HARRY J. HICK, a citizen of the United States, residing at Alliance, in the county of Stark and State of Ohio, have invented certain new and useful Improvements in and Relating to Filing Appliances, of which the following is a specification.

This invention relates to filing appliances adapted for the filing of papers, and similar articles, whereby they may be readily filed and kept together under suitable headings or titles and removed at will.

For the purpose of illustration, I have, in the accompanying drawings, shown and herein described one form of filing appliance embodying my invention.

Figure 1 is a side elevation of a filing appliance embodying my invention, the near side of the casing being broken away to expose the leaves or frames to view. Fig. 2 is a fragmentary perspective view of the upper edges of the leaves removed from the casing. Fig. 3 is a fragmentary perspective view of the upper portion of one of the leaves. Fig. 4 is a longitudinal sectional view through one of the leaves. Fig. 5 is a perspective view of one of the index carrying devices. Fig. 6 is a fragmentary view of one of the end leaves.

In the drawings:—1 indicates a casing or housing, which may be of any suitable or preferred form of construction. The one illustrated comprises a bottom 1ª, side walls 1ᵇ, a back 1ᶜ and a platform or base 1ᵈ extending from one side wall to the other. 2 indicates the series of leaves or frames mounted to swing relative to said base 1ᵈ and to each other. The base 1ᵈ preferably extends forwardly toward the front of the casing to support the leaves in a substantially horizontal position when they are reclined or operated. The pivotal supporting means for the separate leaves preferably comprise pivot devices 2', which hingedly or pivotally connect one leaf with or relative to the adjoining leaf or leaves of the series. The series of leaves may be supported upon stationary pivots, such as 3, at its front end. When the leaves are provided with pivot devices of this type, their operation separately or in groups from the vertical position to the horizontal position operates to move the lower edges of the leaves remaining in the vertical position forwardly. When those leaves in the horizontal position are swung into the vertical position, the vertical leaves assume their normal positions.

4 indicates a bar or rod which is preferably pivoted at one end relative to the back 1ᶜ. This bar or rod carries at or near its opposite or free end a device, such as a latch, indicated at 4ª, which engages with the upper or free edge of the front leaf and serves to hold or lock all the leaves 2 in normal position. By pressing upwardly on the bar, the latch 4ª is disengaged from the front leaf 2, whereupon the said leaf and each succeeding leaf can be operated. The bar or rod 4, after being released from the front leaf, may be moved upwardly and arranged in either a vertical or inclined position and serve as a guide for the rear leaf. Each leaf 2 comprises a back 2ª, a hinge or supporting bar 2ᵇ along its lower edge, a series of strips 2ᶜ on one or both of its faces, and a series of paper or slip supporting clips 2ᵈ arranged on one or both faces of said leaf. The back is preferably formed of sheet metal which may be extended along its lower edge and bent into a hollow member, preferably of rectangular shape, to serve as the hinge bar 2ᵇ.

The clips 2ᵈ are preferably formed of resilient wire and may carry a plate 2ᵉ on which may be shown the name or heading or other signaling index device such as a number or letter under which the papers or slips filed behind the clip are classified. The strips 2ᶜ are separated from each other to divide the adjacent leaf into spaces or pockets to receive the papers or slips. They also extend longitudinally from end to end of the leaf and parallel to each other, one strip being arranged along either edge of the leaf to protect and strengthen the adjacent edge thereof. In addition to their functions as strengthening and pocket forming means for the leaves, the strips 2ᶜ also operate to space each leaf from the adjoining leaf whereby a suitable space is provided to receive the papers or slips filed behind the clips without danger of their engagement with the papers or clips on the adjoining leaf. For this purpose, the strips 2ᶜ on one leaf are preferably alined with the strips 2ᶜ on the adjoining leaf.

2ᵉ' indicates a pin or rivet which secures each strip 2ᶜ, or one strip 2ᶜ on one face of a leaf and another strip on the opposite face of the leaf, to the back 2ª thereof. As many pins or rivets 2ᵉ' for each strip or alined strips may be used as desired.

5 indicates an index support or supports mounted on the upper or free edge of each leaf 2 on one or both sides thereof. The purpose of this support is to hold or support the signaling, guiding or index devices for each leaf in a position where each and all of them can be plainly seen. Such positioning thus effects a quick perception to the eye and mind of the operator, and results in permitting a quick and accurate manipulation of the leaves. These supports 5 extend laterally to a point substantially coinciding with the outer edges or surfaces of the strips 2ᶜ and coöperate with the index supports 5 of the adjoining leaf or leaves to entirely close the space between the leaves. As the opposite end leaves of the series of leaves are provided with filing spaces or pockets on their inner faces, they are provided with only one index or signal support 5, as shown in Fig. 6.

In the illustrated form of the construction, the signal supports of each leaf are formed by extending the back 2ª at and along its upper edge and bending such extended portion longitudinally first at right angles, as shown at 5ª, then bending or doubling the metallic sheet on itself along a parallel longitudinal line and carrying it upwardly in an inclined direction to form an inclined wall 5ᵇ. The metal is then bent along a longitudinal line, preferably in the plane of the back 2ª and extended downwardly to form the inclined wall 5ᶜ. Preferably the free edge of the metal is bent inward, first in a direction perpendicular to the back 2ª, as shown at 5ᵈ and then parallel to the back 2ª, as shown at 5ᵉ. This latter portion may be secured rigidly to the back whereby the index support will be supported on both sides of the leaf and the adjacent leaf strengthened against twisting or bending stresses.

As will be apparent from Fig. 2, the inclined walls 5ᵇ, 5ᶜ, of each leaf carry suitable index or signaling devices which indicate to the operator the particular headings or file spaces carried by that leaf. Since the walls 5ᵇ, 5ᶜ, are inclined, it will be seen that the index or signaling devices are supported in a manner to meet the vision of the eye and thus facilitate the quick and accurate operation of the leaves. When the leaves 2 are in normal position, all the index or signaling devices on corresponding walls adjacent the front sides of the leaves are in view; and when the leaves are in a horizontal position, the index or signaling devices on corresponding walls adjacent the rear sides of the leaves are in view.

In order that the index or signaling devices can be quickly applied to the leaves, as well as changed or renewed at will, I provide a clamp plate 6, on which is printed or otherwise shown an index or signaling number or letter. This plate is formed of resilient metal and shaped to fit over or around the walls of the space closing index supporting devices for each leaf. This plate 6 may be placed in position, such as illustrated in Fig. 4, or removed, by spreading its free ends, the resiliency of the metal operating to hold it in position on the supporting walls or devices. As shown in the drawings, the plate 6 is shaped and formed to lie in close engagement with the inclined walls 5ᵇ and 5ᶜ of the supports or devices 5. The index or signaling devices are arranged out of line with each other from front to rear, as shown in Fig. 2, in order that they can be more clearly seen and distinguished from each other.

7 indicates a recess formed in the upper edges of the index carrying walls of certain of the leaves. These recesses are arranged in the index carrying walls, so as to be immediately in front of the index or signaling device for the adjoining rear leaf in order that said device will be wholly exposed to view. As the supports of devices are hollow, it will be seen that the forming of the recesses 7 in the walls 5ᵇ, 5ᶜ, provides two free edges 7ª, 7ª, between the ends of each recess, slightly separated from each other by an opening. The leaves can be operated, by placing the finger or fingers of the operator in the recesses, the near edges of the walls forming the recesses affording good gripping edges by which to operate the leaves.

As will be seen from the drawings, the extended metal at the upper edge of each leaf or frame is bent into triangular shape, preferably of equilateral form, its base lying in a plane perpendicular to the back 2ª and its apex in a plane coinciding therewith. It will also be understood that the laterally projecting walls 5ª and 5ᵈ prevent the papers or slips in the upper row of pockets on the leaves from working up or slipping out.

To those skilled in the art of making filing appliances of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:—

1. A filing appliance comprising a support and a series of frames mounted thereon and arranged to swing individually or collectively relatively thereto, each frame comprising a back having an index supporting wall arranged at an acute angle to the plane of said back and extending from end to end of the back along its free edge.

2. A filing appliance comprising a support and a series of frames each having a back pivotally mounted at one end to swing relatively to said support, the back being formed of metal which is extended at its opposite end and bent to form an inclined index supporting wall arranged at an acute angle to the plane of said back, and the free end of the metal bent inwardly for engagement with the back.

3. A filing appliance comprising a support and a series of frames mounted thereon and arranged to swing individually or collectively relatively thereto, each frame comprising a back having a pair of index supporting walls arranged at an angle to each other and each at an angle to the plane of said back, whereby when each frame is in one position one of its said index supporting walls is exposed to the eye of the operator and when in another position its other index supporting wall is so exposed.

4. A filing appliance comprising a support and a series of frames mounted thereon and arranged to swing individually or collectively relatively thereto, each frame comprising a back having an index supporting wall arranged at an acute angle to the plane of and along the free edge of said back, the said wall engaging and coöperating with the wall of the adjoining frame to close the space between the frames.

5. A filing appliance consisting of a series of frames of uniform shape and size each comprising a back hinged at one end to the adjacent ends of the adjoining frame backs in said series and each frame back having at its free end an end wall arranged at right angles to the plane of said back and an index supporting wall arranged at an acute angle to the plane of said back.

6. A filing appliance comprising a series of frames of uniform shape and size each comprising a back hinged at one end to the adjacent ends of the adjoining frame backs in said series, and each frame back carrying a pair of index supporting walls, the walls of each pair being at an angle to each other and to the plane of the back.

7. A frame for a filing appliance, comprising a back of relatively thin material having at its upper and lower edges, respectively, hollow longitudinally disposed strengthening members, one being a hinge bar and the other being an index support, one wall of which is inclined to the plane of the frame to expose the index supported thereby.

8. In a filing appliance, the combination of a series of leaves mounted to swing relative to each other, and a plate carried by each leaf along its free edge, the said plate being bent along a longitudinal line to form inclined walls extending in opposite directions relative to the plane of the leaf.

9. In a filing appliance, the combination of a series of leaves mounted to swing relative to each other, a plate carried by each leaf along its free edge, the said plate being bent along a longitudinal line to form inclined walls extending in opposite directions relative to the plane of the leaf, and a removable index-carrying plate fitted over said inclined walls.

10. In a filing appliance, the combination of a series of leaves mounted to swing relative to each other, a plate carried by each leaf along its free edge, the said plate being bent along a longitudinal line to form inclined walls extending in opposite directions relative to the plane of the leaf, the opposite outer longitudinal edges of the inclined walls coöperating with the outer longitudinal edges of the inclined walls on adjoining leaves to close the space between adjoining leaves.

11. A leaf for a filing appliance formed from sheet metal and comprising a back, the metal at one end of said back being extended and bent along longitudinal lines to form a hollow bar substantially triangular in cross section, the sides thereof forming supports for signal devices.

12. A leaf for a filing appliance formed from sheet metal and comprising a back, the metal at one end of said back being extended and bent along longitudinal lines to form a hollow bar substantially triangular in cross section the base of which lies in a plane substantially perpendicular to the said back and the sides thereof forming supports for signal devices, the free end of the metal being arranged parallel to the adjacent face of the back and secured thereto.

13. A leaf for a filing appliance formed from sheet metal and comprising a back, the metal at one end of said back being extended and bent along longitudinal lines to form a hollow bar substantially triangular in cross section, and the metal along the opposite end of the back being extended to form a hollow hinge bar.

14. A leaf for a filing appliance formed from sheet metal and comprising a back, the metal at one end of said back being extended and bent along longitudinal lines to form a hollow bar substantially triangular in cross section, the walls of said bar being cut away to form a space between the inclined sides of the bar to receive the finger of the operative in operating the leaf.

15. A filing appliance comprising a support and a series of frames mounted thereon and arranged to swing relatively to each other, each frame comprising a back, an inclined wall carried by said back along its free end for supporting an index and a support between the outer end of said inclined wall and the back.

16. A filing appliance comprising a support and a series of frames mounted thereon and arranged to swing relatively to each other, each frame formed from sheet metal and comprising a back and an index supporting wall formed integral with and inclined downwardly and outwardly relative to the back when it is in upright position.

17. A leaf for a filing appliance comprising a back having an index support triangular in cross section and supported by the said back intermediate the ends of one of the sides of said triangular support.

In testimony whereof I affix my signature, in the presence of two witnesses.

HARRY J. HICK.

Witnesses:
 MILTON BEJACH,
 HENRY F. POLLOCK.